R. W. SVENNING.
APPARATUS FOR THE REVISION OF BALLS.
APPLICATION FILED SEPT. 11, 1920.

1,429,797.

Patented Sept. 19, 1922
2 SHEETS—SHEET 1.

FIG. 1.

Inventor
R. W. Svenning
H. R. Kerslake.
Attorney

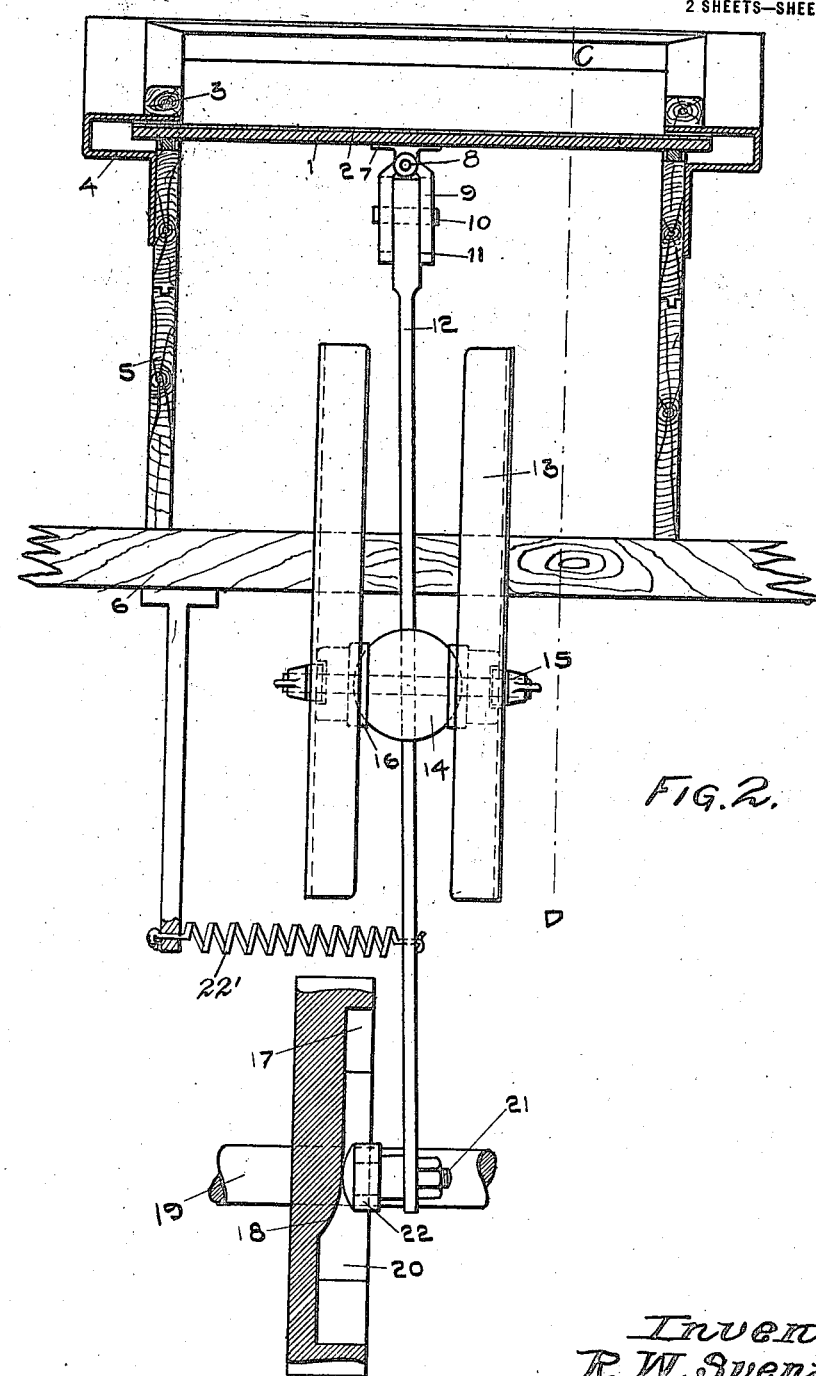

1,429,797

Patented Sept. 19, 1922.

UNITED STATES PATENT OFFICE.

ROBERT WERNER SVENNING, OF GOTTENBORG, SWEDEN, ASSIGNOR TO NORDISKA KULLAGER AKTIEBOLAGET, OF REGULUSGATAN, LUNDBY, GOTTENBORG, SWEDEN.

APPARATUS FOR THE REVISION OF BALLS.

Application filed September 11, 1920. Serial No. 409,749.

*To all whom it may concern:*

Be it known that I, ROBERT WERNER SVENNING, a subject of the King of Sweden, residing at Gottenborg, in the county of Gottenborg and Bohus and Kingdom of Sweden, have invented a new and useful Improved Apparatus for the Revision of Balls, of which the following is a specification.

The present invention relates to an improved method for the revision of balls and has for its object to provide mechanical means to afford the turning of the balls thus causing their whole surface to be gradually turned to the reviser.

This invention further has for its obect to provide a simple apparatus suited to perform the said method.

The invention is illustrated in the accompanying drawings, whereon the figures show two sectional elevations transversely through the apparatus and taken along two planes with a perpendicular stationary relation to each other. Fig. 1 is then a section along the line C—D of Fig. 2, and Fig. 2 a sectional view along the line A—B of Fig. 1.

According to the figures 5 denotes the sidewalls of an almost square box, mounted upon the base-plate 6. The upper boards of the sidewalls are cut so, that the plate 1 when placed upon them is inclined to the horizontal. Plate 1 is made of a suitable non-transparent material. Upon this plate 1 is mounted a second plate 2, which is made of prepared glass, leather or other suitable material, which will not allow the balls to slip but which will impart motion to them, when the plate 2 is moved. The balls to be revisioned are placed upon the plate 2. To prevent the balls from dropping down the plate 2, the box is provided with a frame 3 mounted upon a casing 4 which encloses the edges of the plates which project beyond the walls 5 of the box. In this casing 4 the plates 1 and 2 have free movement obliquely up and down and laterally within an area limited by frame 4.

Plate 1 with plate 2 affixed are given a mainly rectangular motion obliquely up and down and laterally by means of a rotation shaft 19, which is connected with plate 2 by means of some gearing engine. This gearing is effected by a wheel 20 fixed on the shaft 19 and provided with a cam groove 17. The groove is cordiform in shape and provided with projections 18 at the bottom. In the groove is a plug or roller 22 movable. This plug or roller is attached to a double-armed lever 12 by means of a pinbolt 21. The opposite end of this lever is adapted to an elliptical slot 11, through which a bolt 10, which is fixed to a fork 9 passes. The fork 9 is on the other side affixed to the center-plate 7 by means of a pin 8. By this construction a fair universal joint is acquired between the lever 12 and the plate 1. The lever 12 is movable at its midpart along the ball-joint 14, which is properly supported in two side members 16 with spherical stations for the ball joint 14. The frame-parts 16 are mounted by means of screws 15 upon slides 13, so as to have a vertical movement and to be clamped in any desired position by means of the screws 15.

When the shaft 19 together with the wheel 20 is brought into rotation by any suitable means, the roller 22 which is held by spring 22' so as to operate in the groove 17, is moved from side to side as shown in Fig. 1. As the lever is fulcrumed at the ball joint 14, the end, which is pivoted at 10 will impart motion to the plate 1 through the fork 9 and the pin 8, thus sliding the plate 1 up and down the inclined plane made by the two walls 5 shown in Fig. 1. Owing to the projections 18 in the cam groove 17 the lever 12 will also be given a movement at right angles to that shown in Fig. 1 and is represented as a sideways movement to Fig. 2, which is across the inclined plane. In this manner two motions at right angles are imparted to the plate 1.

By adjusting the ball-joint the degree of the movement of the plate 1 may be altered according to the size of the balls so that the whole surface of each ball is exposed to view.

What I claim is:

1. An apparatus for the revision of balls for bearings including a movably mounted inclined member having a plane surface, and means for imparting an oscillating motion in two directions at right angles to each other so that the plane surface will rotate the said balls and thus enable every spot of their surfaces to be seen from one and the same direction.

2. An apparatus for the revision of balls for bearings comprising a movable member having a plane surface inclined at an angle adapted to support the balls, a frame capable of supporting the said member and means for imparting to the said member an oscillating motion in two directions at right angles.

3. An apparatus as claimed in claim 2 in which the movable member consists of a plate of nontransparent material, another plate mounted thereon made of prepared glass, a box-like frame upon which the plates rest, the edges of said plates projecting beyond the box and protecting the casing from projecting ends of the plates, and a frame mounted on the casing to prevent the balls rolling off the said plates.

4. An apparatus as claimed in claim 2 in which the means imparting the motion to the movable member comprises a lever universally attached to one end of said member, a cam groove, a roller slidable in the groove and having connection with the other end of the lever, a ball and socket joint connected to the medial portion of the lever and forming a fulcrum about which the lever pivots, a frame for supporting said ball and socket joint adjustable along the lever so as to be clamped in any desired position in order to vary the extent of movement of the movable member.

5. An apparatus as claimed in claim 3, in which the cam groove is cordiform in shape and has projections at the bottom of the groove so as to impart to the lever an oscillating movement in two directions at right angles.

In testimony whereof I have affixed my signature.

ROBERT WERNER SVENNING.